July 29, 1941.  L. R. BROWN  2,251,033
LAPPING MACHINE
Filed Feb. 23, 1940  3 Sheets-Sheet 3
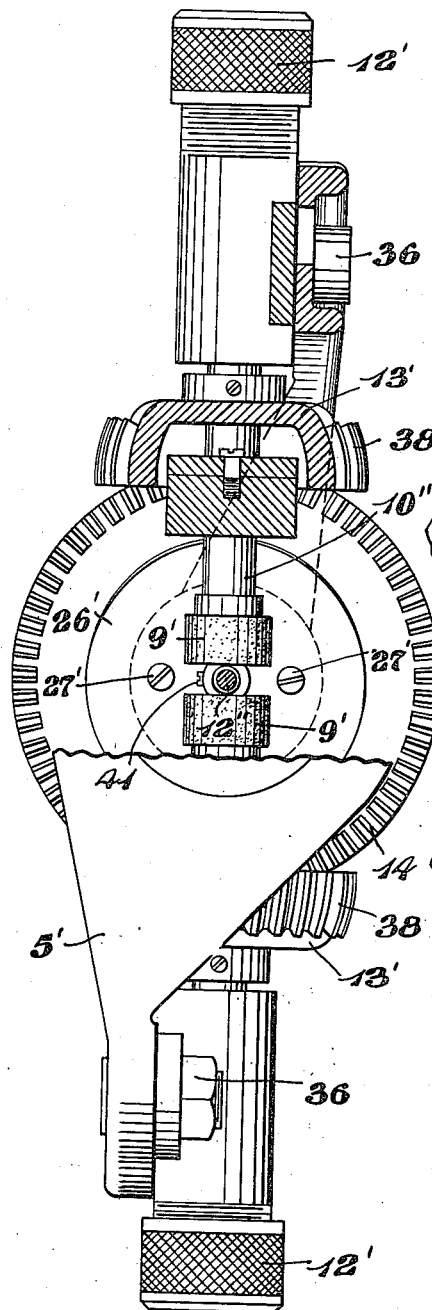
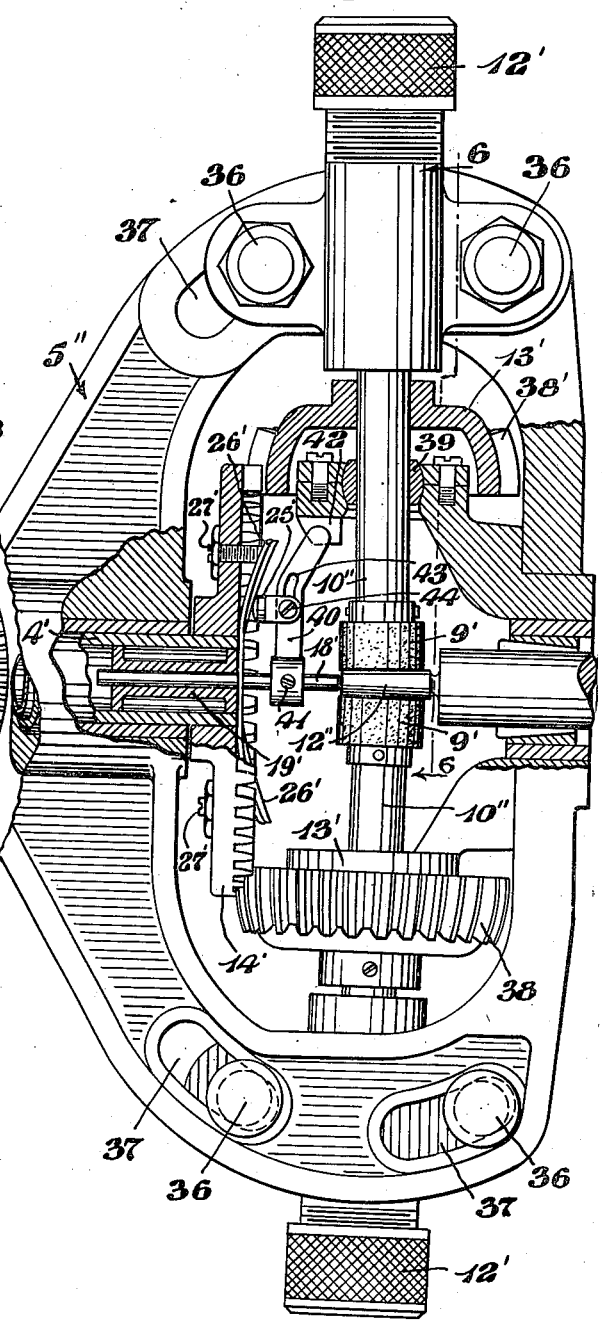
INVENTOR
LEE R. BROWN.
BY
E. W. Anderson & Son.
ATTORNEY Patented July 29, 1941

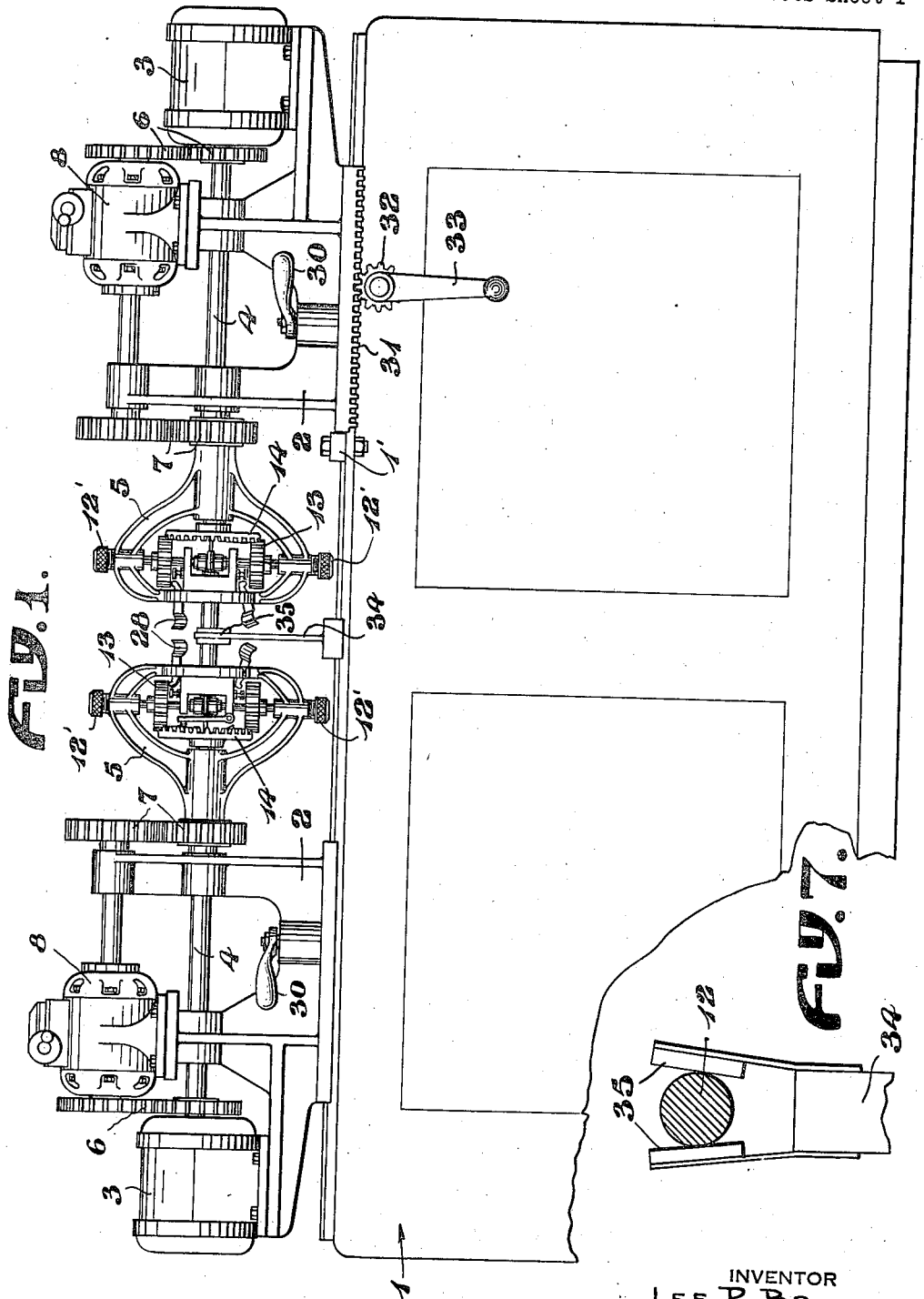

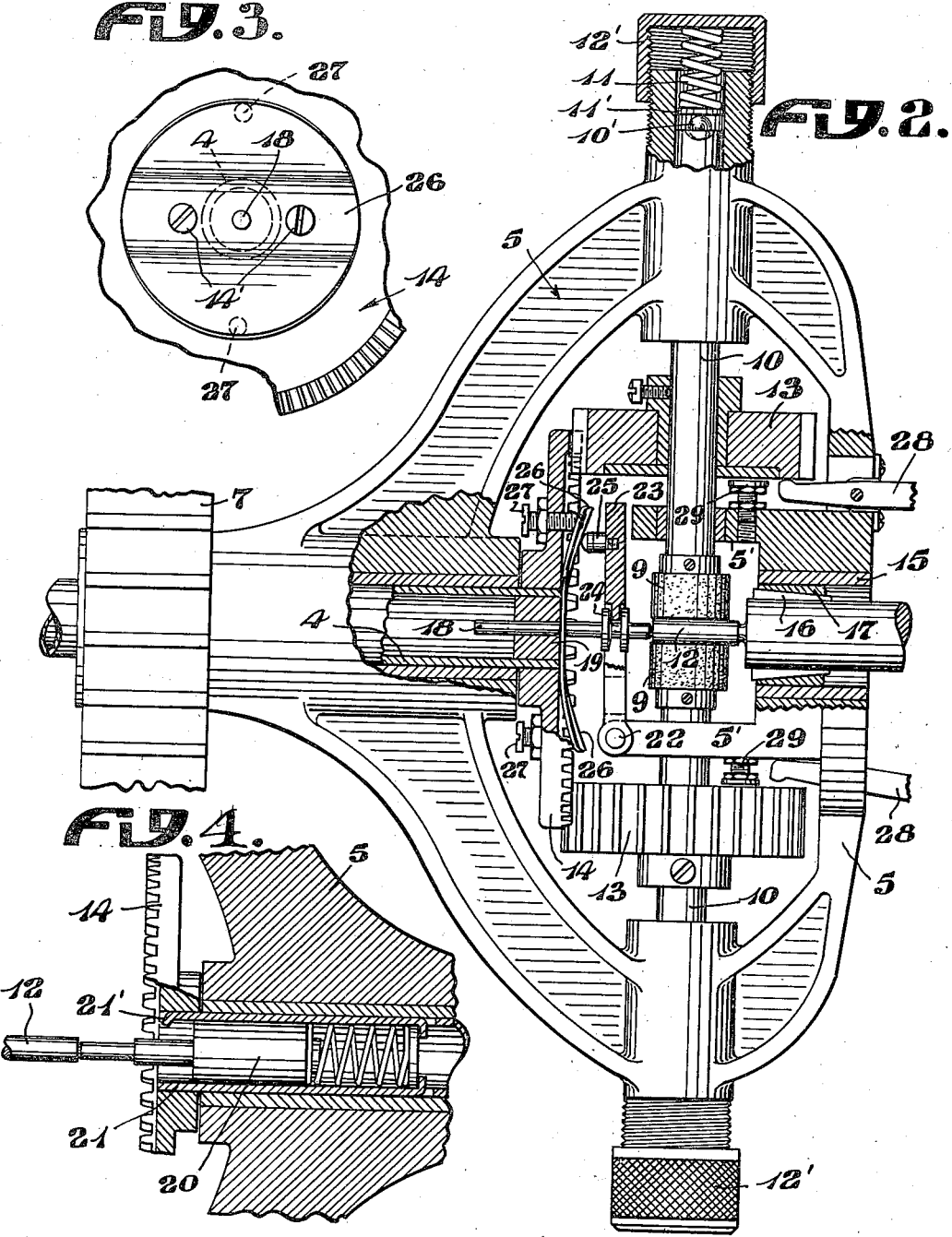

2,251,033

UNITED STATES PATENT OFFICE 2,251,033

LAPPING MACHINE

Lee R. Brown, Whippany, N. J., assignor to Monroe Calculating Machine Company, Orange, N. J., a corporation of Delaware Application February 23, 1940, Serial No. 320,501

17 Claims. (Cl. 51—120)

The invention relates to lapping or honing machines, and particularly those for tooling work such as plug gages, shafts, cams, etc., wherein the part of the work to be tooled may be eccentric with relation to the body of the work, or the work may be provided with an annular shoulder of larger diameter than that of a part of the work to be tooled, making centerless tooling with known machines impractical.

An object of the invention is to tool the work in such cases without the abrasion of ring scratches. Another object is to so tool cylindrical portions of the work and to simultaneously tool such an annular shoulder. Another object is to avoid tendency to taper the work in one form of the invention, and in a modification thereof to tool tapered work. Other objects of the invention will appear hereinafter.

The invention consists in the novel construction and combinations of parts as hereinafter set forth in the claims.

In the accompanying drawings,

Figure 1 is a side view of the invention, showing two of the units engaging opposite end portions of the work, Figure 2 is a side view, partly in section and partly broken away, of one of these units engaging one end portion of the work, Figure 3 is a detail face view of the cam member of the means for reciprocating the work, showing the crown gear (partly broken away) to which said cam member is secured, Figure 4 is a detail sectional view showing the opposed unit engaging the opposite end portion of the work, parts being broken away, Figure 5 is a view similar to Figure 2, showing a modification, Figure 6 is a section on the line 6—6, Figure 5, and Figure 7 is a detail edge view of the spring clip, parts being broken away.

In these drawings, the numeral 1 designates a stationary base frame, having clamped in longitudinally aligned position thereon a plurality of lapping units adapted to simultaneously tool both end portions of the work, each unit comprising a supporting frame 2 having mounted thereon a motor 3, directly driving a shaft 4, said shaft carrying at its inner end loose thereon a rotary head 5, said head being rotated through enmeshed gear couples 6 and 7, the lower members of said couples being mounted respectively on shaft 4 and rotary head 5 and the upper members having driving connection through speed changer 8 to vary the speed of said rotary head 5.

Mounted upon the rotary head 5 of each unit are opposite rotary tools 9, the shafts 10 of which are longitudinally aligned and spring pressed at 11 to elastically press the tools 9 against the work 12. The opposite tools 9 are rotated by means of gears 13, fast upon the tool shafts 10 and meshing with crown gear 14 fast upon the shaft 4.

Thus shaft 4 will rotate the opposite tools 9 in opposite directions and will simultaneously rotate head 5 to revolve the tools 9 in an orbit about the work 12.

The work 12 is held at both ends thereof within identical bushings 15 of the heads 5 of two of said lapping units, by means of identical tapered collets 16, having wedging engagement with tapered apertures of identical slides 17 working within said bushings 15.

The following means is provided to reciprocate the work 12 between the opposite tools simultaneously with revolution of the tools 9 in an an orbit about the work 12 and rotation of the tools 9.

The work 12 is at one end thereof engaged by plunger 18, working within the aperture of bushing 19 of said tubular shaft 4, of one of said units, and at the opposite end thereof is engaged by spring-pressed plunger 20, working within sleeve 21 of another of said units, thereby tending to hold the work to the left, as shown, and to return the work to normal position by giving it a stroke to the left following the stroke of the work to the right.

Pivoted at 22 to an extension 5' of the head 5 of one of said units is a bail 23, engaging spool collar 24 of plunger 18, and having at the free end thereof a stud 25 held in contact with a cam 26 by the aforesaid spring-pressed plunger 20 engaging the work 12, said cam 26 being made fast to crown gear 14 of said unit by screws 14' and composed of suitable thin resilient material of circular form so that it is capable of being deformed or distorted from normal planular disk form by either or both of two diametrically opposite set screws 27 of said crown gear to impart as shown two strokes to the right to the plunger 18 and to the work for each rotation of the cam, an intervening stroke to the left by said spring-pressed plunger taking place prior to the second stroke to the right. If the cam 26 should be deformed by only one of said set screws 27, only one stroke to the right will be given the plunger 18 and the work 12 for each rotation of the cam 26.

The reciprocatory movement of the work 12 is capable of being varied for different work by adjustment of the set screws 27 to variably deform the cam 26.

The outer end of each of the tool shafts 10 is provided with a seat for a ball 10', said ball being engaged by spring 11 through the medium of a washer 11', said spring being at its outer end engaged by screw cap 12' of head 5 to vary the tension of the spring and the elastic pressure of the tool 9 upon the work 12.

Due to reciprocation of the work 12 simultaneously with rotation of the tool 9 and the hunting cog of gear 14, a point on the work part to be honed will be continually changing position with respect to a point on the tool and vice versa, so that a point on the tool will strike a point on the work at such intervals as will avoid the abrasion of ring scratches, this being further assured by the reciprocation of both ends of the work past diametrically opposite portions of the faces of the tools during the honing. The abrasion of ring scratches will also be avoided by reciprocation of the work simultaneously with revolution of the tools about the work.

The cam means for accomplishing the strokes of the work to the right or in one direction is capable of use with work of varying diameters and lengths without change of tools.

By varying the speed or rotation of the head 5 through speed changer 8 in revolving the tools 9 in an orbit about the work 12, relative to the speed of rotation of the tools 9, it is possible to obtain best results with different work.

By using only one of the aforesaid lapping units, together with a spring-pressed plunger mounted in obvious manner, to return the work to the left following stroke to the right, one instead of both end portions or spindles of the work may be honed.

It will be obvious that by simple modification of the present disclosure, an intermediate portion or portions of the work may be honed, instead of one or both end portions of the work.

It will also be obvious that by providing collets 16 having the apertures thereof eccentric with relation to the longitudinal axes of the slides 17, cylindrical portions of the work eccentric relative to the body of the work will be held centered with respect to the longitudinal axis of tubular shaft 4, so that these eccentric portions may be honed.

Manipulable levers 28, fulcrumed to head 5 have the work arms thereof engaging gears 13, and are adapted to spread the tools apart against the tension of the springs 11 to facilitate insertion and removal of the work 12, the head 5 being provided with set screws 29 to limit the inward movement of gears 13 and the inward movement of the tools 9 upon release of said levers 28.

Sleeve 21 is provided with an inward projection 21' to limit the outward movement of plunger 20 within said sleeve 21.

The supporting frame 2 of the plurality of lapping units are clamped to base frame 1 through the medium of manipulable levers 30, means being provided for longitudinally adjusting one of said units relative to another of the units and to the work 12 to facilitate insertion and removal of the work 12, comprising rack 31 of one of the frames 2, and pinion 32 the shaft of which has rotary bearings in said base frame and an operating crank 33. The base frame is provided with suitable means 1' for limiting the inward movement of the longitudinally adjustable lapping unit. A standard 34 of said base frame is located between the lapping units, being provided with an upper spring clip 35 adapted to embrace the body of the work 12 lightly but to resist any tendency of the work 12 to rotate, such tendency being negligible since the two units rotate in opposite directions. The spring clip 35 is also adapted to permit free lateral movement of the work body into and out of the clip. It will be obvious, however, that adjacent lapping units may rotate in the same direction, rather than in opposite directions.

The invention is adapted to tool a shoulder or shoulders of the work of larger diameter than and adjacent an end spindle or spindles or other portions of the work being honed. The contact of the tools 9 with such shoulder during the reciprocation of the work 12 while only at the end of the work stroke in one direction, is sufficient to remove fragmentary material from and improve the surface of the shoulder.

In Figures 5 and 6 of the drawings, a modification of the invention is shown, for lapping frusto-conical or tapered spindles or parts of the work. In these figures parts are designated by reference characters differentiated by the exponent 1 from similar reference characters of the main form of the invention.

In this modification, the outer portions of the rotary head 5'' wherein the tool shafts 10'' have rotary bearings, are separate from said frame and are clamped in position by means of bolts 36 engaging arcuate slots 37 of said head 5'', said bolts 36 being capable of variable adjustment along said slots 37 to vary the tilt of said shafts 10'' and of the tools 9' with respect to the work 12'' in accord with the desired degree of taper to be obtained. The gears 13' of said tool shafts 10'' are provided with arcuate teeth 38 to assure proper meshing with the teeth of the crown gear 14' in the tilting of said shafts 10''. In tilting the tool shafts 10'' and the tools 9' it will, of course, be necessary to adjust the tension of the springs 11, this being done by adjustment of screw caps 12'. The inner portions of the head 5'' wherein the tool shafts 10'' have rotary bearings are in this modification provided each with a universal joint 39, with the inner movable member of which the related tool shaft is engaged, so that it may be freely tilted. The universal joints 39 are located within inner cavities of the gears 13' which latter are, therefore, bell shaped.

Figures 5 and 6 also show a modification of bail 23, this being an arm 40, fixedly secured upon plunger 18' by set screw 41, said arm having the stud 25' thereof contacting the cam 26'. And in order to prevent any pivotal movement of the arm 40 upon the plunger 18', the free end of said arm 40 engages within a notch 42 of the stationary member of the universal joint 39 adjacent to said arm.

The stud 25' of radial arm 40 is capable of adjustment radially with respect to the cam 26' to vary the reciprocatory movement of the work 12'' imparted thereto by the cam, said arm having a slot 43 along which clamp screw 44 of the stud 25' is variably movable, for this purpose. The above named adjustment is supplemental to that obtained by adjustment of set screw or screws 27'.

In Figure 5, the bushing 19' of shaft 4' within the central aperture of which plunger 18' works is of modified form from that shown in Figure 2 of the drawings.

I claim:

1. In a lapping machine, the combination of opposite rotary tools, means for elastically pressing said tools against the work, means for adjustably tilting said tools for tapered work, and means for reciprocating the work between the opposite tools including spring-retracted plunger means engaging opposite ends of the work and cam-operated means for moving said plunger means in one direction against the tension of the spring thereof.

2. In a lapping machine, the combination of opposite rotary tools, means for elastically pressing said tools against the work, and means for reciprocating the work between the opposite tools including spring-retracted plunger means engaging opposite ends of the work and cam-operated means for moving said plunger means in one direction against the tension of the spring thereof provided with an elastic member and means for deforming said member to impart a varying number of strokes in one direction to the work during a single rotation of said member.

3. In a lapping machine, the combination of a rotary head, rotary tools having opposed flat honing faces and aligned shafts provided with bearings in said head, means for elastically pressing said tools against the work, means for adjustably tilting said shafts and said tools for tapered work, and means for reciprocating the work between said tools.

4. In a lapping machine, the combination of a rotary head, rotary tools having opposed flat honing faces and aligned shafts provided with bearings in said head, means for elastically pressing said tools against the work, and means for reciprocating the work between said tools including spring-retracted plunger means engaging opposite ends of the work and means for moving said plunger means in one direction against the tension of the spring thereof including a member having a lateral cam face.

5. In a lapping machine, the combination of a rotary head provided with opposite extensions, rotary tools having opposed flat honing faces and aligned shafts provided with bearings in said head extensions, means for elastically pressing said tools against the work, and means for reciprocating the work between said tools, the bearing portions of said extensions having adjustable slot and bolt connections with the main portions thereof for tilting said shafts and said tools for tapered work.

6. In a lapping machine, the combination of a rotary head, rotary tools having opposed flat honing faces and aligned shafts provided with bearings in said head, means for elastically pressing said tools against the work, a work holder having sliding bearings in said head, and means for reciprocating said work holder to reciprocate the work between said tools.

7. In a lapping machine, the combination of a rotary head, rotary tools having opposed flat honing faces and aligned shafts having bearings in said head, means for elastically pressing said tools against the work, a work holder having sliding bearings in said head, means for reciprocating said work holder to reciprocate the work between said tools, and means for rotating said shafts and said tools and simultaneously revolving said head, shafts and tools in an orbit about the work.

8. In a lapping machine, the combination of a rotary head, rotary tools having opposed flat honing faces and aligned shafts provided with bearings in said head, means for elastically pressing said tools against the work, a work holder having sliding bearings in said head, and means for reciprocating said work holder to reciprocate the work between said tools, said work holder being provided with means for centering concentric or alternatively eccentric cylindrical portions of the work between said tools.

9. In a lapping machine, the combination of a rotary head, rotary tools having opposed flat honing faces and aligned shafts provided with bearings in said head, means for elastically pressing said tools against the work, a work holder having sliding bearings in said head, means for reciprocating said work holder to reciprocate the work between said tools, and means for rotating said shafts and said tools and simultaneously revolving said head, shafts and tools in an orbit about the work, said work holder being provided with means for centering concentric or alternatively eccentric cylindrical portions of the work between said tools.

10. In a lapping machine, the combination of a rotary head, rotary tools having opposed flat honing faces and aligned shafts provided with bearings in said head, means for elastically pressing said tools against the work, a work holder having sliding bearings in said head, means for reciprocating said work holder to reciprocate the work between said tools, and means for rotating said shafts and said tools and simultaneously revolving said head, shafts and tools in an orbit about the work, said work holder being provided with means for centralizing cylindrical end portions of the work of diameter smaller than that of the body thereof between said tools.

11. In a lapping machine, the combination of a rotary head, rotary tools having opposed flat honing faces and circumferential honing faces and aligned shafts provided with bearings in said head, means for elastically pressing said tools against the work, a work holder having sliding bearings in said head, means for reciprocating said work holder to reciprocate the work between said tools, and means for rotating said shafts and said tools and simultaneously revolving said head, shafts and tools in an orbit about the work, said work holder being provided with means for centralizing cylindrical end portions of the work of diameter smaller than that of the body thereof between said tools, and for presenting an annular shoulder of the work to said circumferential honing faces.

12. In a lapping machine, the combination of a head constituting a tool holder, rotary tools having opposed flat honing faces and aligned shafts provided with bearings in said head, means for elastically pressing said tools against the work, a work holder having sliding bearings in said head, means for reciprocating said work holder to reciprocate the work between said tools, and means for rotating said shafts and said tools and simultaneously rotating one of said holders.

13. In a lapping machine, the combination of a head constituting a tool holder, rotary tools having opposed flat honing faces and aligned shafts provided with bearings in said head, means for elastically pressing said tools against the work, a work holder having sliding bearings in said head, means for reciprocating said work holder to reciprocate the work between said tools, and means for rotating said shafts and said tools and simultaneously rotating one of said holders, said work holder being provided with means for centralizing concentric or alternatively eccentric cylindrical portions of the work between said tools.

14. In a lapping machine, the combination of a head constituting a tool holder, rotary tools having opposed flat honing faces and aligned shafts provided with bearings in said head, means for elastically pressing said tools against the work, a work holder having sliding bearings in said head, means for reciprocating said work holder to reciprocate the work between said tools, and means for rotating said shafts and said tools and simultaneously rotating one of said holders, said work holder being provided with means for centralizing a cylindrical end portion of the work of diameter smaller than that of the body thereof between said tools.

15. In a lapping machine, the combination of a head constituting a tool holder, rotary tools having opposed flat honing faces and circumferential honing faces and aligned shafts provided with bearings in said head, means for elastically pressing said tools against the work, a work holder having sliding bearings in said head, means for reciprocating said work holder to reciprocate the work between said tools, and means for rotating said shafts and said tools and simultaneously rotating one of said holders, said work holder being provided with means for centralizing a cylindrical end portion of the work of diameter smaller than that of the body thereof between said tools and for presenting an annular shoulder of the work to said circumferential honing faces.

16. In a lapping machine, the combination of a rotary head, tools having opposed flat honing faces and aligned shafts provided with bearings in said head, means for elastically pressing said tools against the work, means for reciprocating the work between said tools including spring-retracted plunger means engaging opposite ends of the work and means for moving said plunger means in one direction against the tension of the spring thereof including a member having a lateral cam face, and means for revolving said head, shafts and tools in an orbit about the work.

17. In a lapping machine, the combination of a rotary head, tools having opposed flat honing faces and aligned shafts provided with bearings in said head, means for elastically pressing said tools against the work, means for reciprocating the work between said tools including spring-retracted plunger means engaging opposite ends of the work and cam-operated means for moving said plunger means in one direction against the tension of the spring thereof provided with an elastic member and means for deforming said member to impart a varying number of strokes in one direction to the work during a single rotation of said member.

LEE R. BROWN.